(No Model.)

S. R. KNEELAND.
RELIEF VALVE.

No. 251,897. Patented Jan. 3, 1882.

Witnesses:
P. Walton
Joseph B. Braman.

Inventor:
Sylvanus R. Kneeland,
per C. A. Shaw
Atty.

UNITED STATES PATENT OFFICE.

SYLVANUS R. KNEELAND, OF BOSTON, MASSACHUSETTS.

RELIEF-VALVE.

SPECIFICATION forming part of Letters Patent No. 251,897, dated January 3, 1882.

Application filed September 17, 1881. (No model.)

*To all whom it may concern:*

Be it known that I, SYLVANUS R. KNEELAND, of Boston, in the county of Suffolk, State of Massachusetts, have invented a certain new and useful Improvement in Relief-Valves, of which the following is a description sufficiently full, clear, and exact to enable any person skilled in the art or science to which my invention appertains to make and use the same, reference being had to the accompanying drawings, forming a part of this specification, in which—

Figure 1:
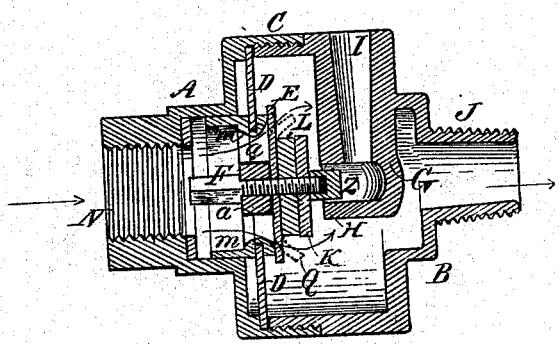
Figure 2:
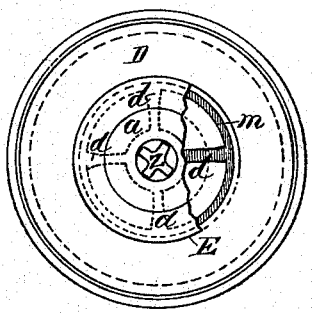

Figure 1 is a vertical longitudinal section, and Fig. 2 a plan view, of the diaphragm.

Like letters of reference indicate corresponding parts in the different figures of the drawings.

My invention relates to the class of valves known as "relief-valves," employed in connection with the air-brakes of railway-cars; and it consists in a novel construction and arrangement of parts, as hereinafter more fully set forth and claimed, by which a simpler, cheaper, and more effective device of this character is produced than is now in ordinary use.

In the drawings, A B represent the two sections forming the body of the valve when screwed together or united, as seen at C.

Within the body there is an annular flexible diaphragm or ring, D, preferably composed of leather, the outer edge or periphery of the ring being secured in the joint C and the inner edge in the short metallic tube $m\,m$, which is fitted to work loosely in the section A.

Within the tube, and preferably cast integral therewith, are four cross-bars, $d\,d$, which intersect at the center of the tube to form the circular hub $a$.

A leather or flexible annulus, E, (shown in Fig. 2 as partially cut away or removed, and having a diameter slightly greater than that of the tube $m$,) is arranged across the inner end of the tube, being sustained in position by the screw-bolt F, nut $z$, and washers K L, the bolt fitting a corresponding female screw in the hub or rest $a$, on the inner end of which hub the leather annulus E rests when the nut $z$ is turned down onto the washer K.

Projecting inwardly, and forming a part of section B, there is an arm, G, having its side next the washer K turned down or planed to form the valve-seat H. This arm is hollow, being provided with an aperture extending inwardly to the longitudinal axial line of the valve, and thence at a right angle toward the diaphragm D, opening into the interior of the valve, as seen in Fig. 1.

The nut $z$ extends into the inner end of the aperture I, and serves to steady or guide the washer K to the seat H as the valve operates, the washer being preferably composed of leather or some similar material, and the nut grooved, as seen in Fig. 2.

In the use of my improvement the valve is attached to the cylinder of the brake by the screw J and to the pump-pipe by the screw N. Being thus connected and the pump operated, the air will pass into the tube $m\,m$, thence through the spaces between the cross-bars $d\,d$, against the outer side of the annulus E, forcing it in the direction of the arm G until the washer K is brought into contact with the seat H, the diaphragm D yielding and the tube $m$ sliding inwardly to permit the same. When the washer K is brought into contact with the seat H and the inward movement of the tube $m$ stops the air will be forced under the outer edge of the annulus E, raising the same from the inner end of the tube $m$, as shown by the dotted lines Q, passing into the body of the valve, and thence into the cylinder in the direction indicated by the arrows, the outlet or aperture I being closed by the washer K. As the pressure from the pump is withdrawn the reverse pressure from the cylinder will force the annulus E down onto the end of the tube $m$, forming its seat, and push the tube outwardly, thus withdrawing the washer K from its seat H and permitting the air from the cylinder to escape through the aperture or outlet I in a manner which will be readily understood by all conversant with such matters without a more explicit description.

Having thus explained my invention, what I claim is—

The improved relief-valve described, consisting of the tube $m$, diaphragm D, annulus E, washer K, nut $z$, and screw-bolt F, in combination with the body A B, provided with the seat H and outlet I, substantially as and for the purpose specified.

SYLVANUS R. KNEELAND.

Witnesses:
C. A. SHAW,
I. WALTON.